United States Patent
Walko, Jr.

(10) Patent No.: US 7,310,559 B2
(45) Date of Patent: Dec. 18, 2007

(54) TIMED CONTROL SYSTEM WITH SHIFTED TIME FEATURES

(75) Inventor: Robert F. Walko, Jr., Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 317 days.

(21) Appl. No.: 10/698,654

(22) Filed: Oct. 31, 2003

(65) Prior Publication Data

US 2005/0094493 A1    May 5, 2005

(51) Int. Cl.
*G05B 11/01* (2006.01)
*G05B 15/00* (2006.01)
(52) U.S. Cl. .......................... 700/17; 700/83
(58) Field of Classification Search .............. 700/17, 700/83
See application file for complete search history.

(56) References Cited

U.S. PATENT DOCUMENTS

| | | | | |
|---|---|---|---|---|
| 5,544,036 A | * | 8/1996 | Brown et al. | 340/825.24 |
| 5,621,662 A | * | 4/1997 | Humphries et al. | 700/276 |
| 5,902,352 A | * | 5/1999 | Chou et al. | 718/102 |
| 6,229,433 B1 | * | 5/2001 | Rye et al. | 340/310.12 |
| 6,473,661 B1 | * | 10/2002 | Wollner | 700/83 |
| 6,595,430 B1 | * | 7/2003 | Shah | 236/46 R |
| 2005/0033707 A1 | * | 2/2005 | Ehlers et al. | 705/412 |
| 2005/0040249 A1 | * | 2/2005 | Wacker et al. | 236/51 |
| 2006/0027671 A1 | * | 2/2006 | Shah | 236/46 R |

\* cited by examiner

*Primary Examiner*—Ronald Hartman, Jr.
(74) *Attorney, Agent, or Firm*—Ostrolenk, Faber, Gerb & Soffen, LLP

(57) ABSTRACT

A control system with a clock or calendar based control has two time frames defined for assigning control events during different days of the week. The weekday time frame is defined as Sunday noon through Friday noon, while the weekend time frame is defined as Friday noon through Sunday noon. The defined timeframes are shifted from conventional definitions of weekday and weekend periods, which permits appropriate control scenarios to be realized that are closer to typical expectations. The control system uses a simple, two-timeframe control that permits greater flexibility in realizing lighting control applications without increased cost.

2 Claims, 2 Drawing Sheets

TIMED CONTROL SYSTEM WITH SHIFTED TIME FEATURES

BACKGROUND OF THE INVENTION

1. Field of the Invention

The present invention relates generally to control systems with a timeclock or calendar for controlling various timed events, and relates more particularly to control systems for timed events that are arranged to occur during specifically defined time periods.

2. Description of Related Art

It is well known to have control systems that are arranged for controlled events based on various timed sequences. For example, heating ventilation and cooling controls (HVAC) often provide different settings based on weekday or weekend time frames. A popular control scheme permits a user to set the control to perform certain events during a weekday timeframe consisting of Monday through Friday, and further sets the control to perform certain events during a weekend timeframe consisting of Saturday and Sunday. Often, the weekday and weekend timeframes have selectable time periods such as morning, afternoon and evening that are applicable to each day defined for the timeframe.

It is often the case in residential or commercial controls that a particular control scenario is desirable for the Monday-Friday timeframe. For example, in a residential environment, a lighting control may be turned off during a late morning and an afternoon time period, and turned on during an evening and early morning time period. In the case of a commercial enterprise, for example, lighting controls may be activated during a morning, afternoon and early evening period, and deactivated during late night and early morning periods. These control scenarios are typically very different from those that are desired for weekend activities. Accordingly, while a same control is often desired for Monday through Friday, a different control is desired for Saturday and Sunday. Lighting, as well as heating systems, for example, are designed to operate at an appropriate level for use during a weekday and then switch to another level during the weekend. One example of a lighting control system that includes a timeclock is the RadioRA® lighting control system, manufactured by Lutron Electronics Co., Inc. The timeclock of the RadioRA® system is described in U.S. patent application Ser. No. 10/681,062.

The separate settings for weekdays and weekends tend to help conserve resources and extend the life of system components. For example, unnecessary lighting is turned off during periods of non-use during a weekday or weekend. The lighting is alternately set to a level consistent with the use of the space to be lighted rather than turned on or off. For example the lighting may be set to a particular dimmed level. Lighting controls in different timeframes are also desirable for a number of other purposes, such as security or aesthetics, for example.

The defined periods for typical timeframe control systems often include a weekday period that extends from midnight Sunday to midnight Friday. The weekend period is often defined as midnight Friday to midnight Sunday. Accordingly, a user setting for a weekday will operate from midnight Sunday to midnight Friday, at which point the control switches to weekend settings for Saturday and Sunday. If a weekday operation is desired for Friday that is different from that of Tuesday, for example, the control settings are manually adjusted on Friday to obtain the desired operation. Similarly, if a weekend operation is desired for Sunday that is different from that of Saturday, the control settings are manually updated. The manual updates or adjustments can often be made on a temporary basis, or may be set to a holding level, for example.

It is often the case that a different weekday setting is desired for Friday because of proximity to the weekend days. A control setting for Friday will often more closely resemble that of the weekend days in practice because of this proximity and the observation of the end of the workweek on Friday. Similarly, it is often the case that control system settings for Sunday evening more closely resemble a weekday than a weekend. A residential lighting control system, for example, may be set to have appearance or aesthetic lighting activated on Friday and Saturday nights, but deactivated the remainder of the time. Alternately, it may be desirable to activate security lighting on Friday night, deactivate the lighting early Saturday morning, reactivate the security lighting on Saturday night, and again deactivate the lighting early Sunday morning. However, as discussed above, these desired scenarios are typically only realized in a two-timeframe type control system by manually setting desired controls on Friday evening and Monday morning, for example. That is, since Friday is included in the weekday control, any changes are reflected in each weekday, Monday through Friday. Also, any changes to Sunday settings are reflected in Saturday operation because of the grouping of weekdays and weekends.

Thus the settings for Sunday evening typically are more desirable as a weekday setting, because it is less likely that the resident will be entertaining or have a need for additional lighting that would be typical of other weekend days. That is, the additional lighting that a user would typically desire for Friday and Saturday evenings is typically undesirable for Sunday evenings.

Accordingly, the control consisting of two timeframes does not reflect the practical situation for automated control application. That is, the defined weekday and weekend timeframes are typically skewed from that which is a desirable timeframe definition based on a two-timeframe control. Automated control cannot be practically realized without some manual programming or setup to overcome the skewed timeframes. However, either scenario, i.e., skewed timeframe definitions or manual intervention, is undesirable for a number of reasons including loss of efficiency, inappropriate lighting scenarios, diminished component lifetime and so forth.

Furthermore, when a weekend timeframe ends, on a Sunday evening, for example, another problem typically occurs with the two-timeframe control system. If a user sets a particular lighting scenario for Saturday evening, for example, that includes additional lighting or a specific lighting for security or aesthetic purposes, this same scenario will be in force on Sunday evening. Because Sunday and Saturday are controlled together in the two-timeframe control system, a lighting event that occurs Saturday evening will also occur Sunday evening. However the Saturday lighting event may be shut off or deactivated early Sunday morning and still be in the weekend time frame. The same is not true of the lighting event occurring on Sunday evening, since a shut off or deactivation that would normally occur early Monday morning, which is no longer in the weekend timeframe. Accordingly, lighting that is activated on Sunday evening, relying on an early morning shut off, does not typically get shut off, since Monday through Friday typically has differently programmed events than the weekend events. In this scenario, lights may be activated on Sunday evening, and stay activated all week, until the next weekend shutoff command is received, typically early on Saturday morning.

One solution to the control problem presented above involves the provision of a separate program for each day of the week. The lighting controls are adjusted as described above, except each day is set separately. With such a control, events can be set for Monday morning, for example, that handle events of the previous evening occurring during the weekend. No other weekdays would be affected by a unique setup for Monday morning in this scenario. However, the single day control setup tends to be higher in cost and more complex to manufacture, for example.

Accordingly, it would be desirable to provide a time or calendar controlled system that provides the user with a time frame suitable for practical applications that more closely follows actual usage.

SUMMARY OF THE INVENTION

In accordance with the present invention, there is provided a shifted time frame control system for controlling a lighting system, or other type of control system, that uses a two-timeframe control. A start point of Friday noon is defined for the beginning of a weekend, with Sunday noon being defined as the end of the weekend. A weekday timeframe begins on Sunday noon and ends on Friday noon. In accordance with this shifted time frame, a weekend event for lighting can begin on Friday afternoon and continue on until Saturday noon, and repeat again from Saturday afternoon until Sunday noon to complete a weekend control system scenario. A weekday control system scenario then begins on Sunday noon and continues until Friday noon with daily settings repeated for each twenty-four hour period. Accordingly, a lighting control scenario for each evening and day throughout the week is provided based on weekday and weekend timeframes that need not be changed to accommodate a midnight timeframe change. The system is more consistent with the usage of lighting controls as desirable by a user, and provides appropriate control periods for lighting control.

According to the present invention, a weekend scenario that ends on Sunday noon for lighting avoids the problem of a lighting event that occurs on Sunday evening with no end point before a timeframe change. Lights that are turned-on on Sunday evening are turned off on a Monday morning, for example, while remaining in a weekday timeframe control setup. The Sunday to Monday lighting control setup is repeated for Monday to Tuesday, Tuesday to Wednesday, and so forth until Friday morning. This control definition permits the lighting controls to be operated more in line with practical uses for desired lighting applications and avoids the problem of lights being turned on without any turn off event, i.e., lights being left on during the day without any real useful purpose.

According to a feature of the present invention, a more practical lighting schedule is obtained that is more appropriate for a weekend from Friday afternoon through Sunday morning. These same time frame scenarios are readily applicable to commercial as well as residential environments. It should be apparent that a standard week need not be used for the timeframe definition, but rather any type of two-timeframe control scenario may be realized encompassing one or more days in each timeframe.

In addition, the time periods used to define the two timeframes can be made flexible, according to the needs of the residential or commercial application. For example, a weekend can be made to begin on a Friday evening at 5 o'clock p.m., and end on a Sunday evening at 8 o'clock p.m. The invention simplifies the controls needed for a lighting system that includes timed or calendar control, and provides a lower cost and less complex solution for differentiating scenarios based on different times of the week, such as weekdays and weekends.

Other features and advantages of the present invention will become apparent from the following description of the invention, which refers to the accompanying drawings.

BRIEF DESCRIPTION OF THE DRAWINGS

The present invention is described in greater detail below with reference to the accompanying drawings, in which.

DETAILED DESCRIPTION OF EMBODIMENTS OF THE INVENTION

The present invention provides a technique for avoiding unwanted control system events in a two-timeframe control scenario, such as can be the case in lighting control systems. The invention defines a specific timeframe relationship between practical lighting needs and readily understood conventions, such as weekend and weekday lighting scenarios. A simple and inexpensive control that is intuitive in application results.

Figure 1:
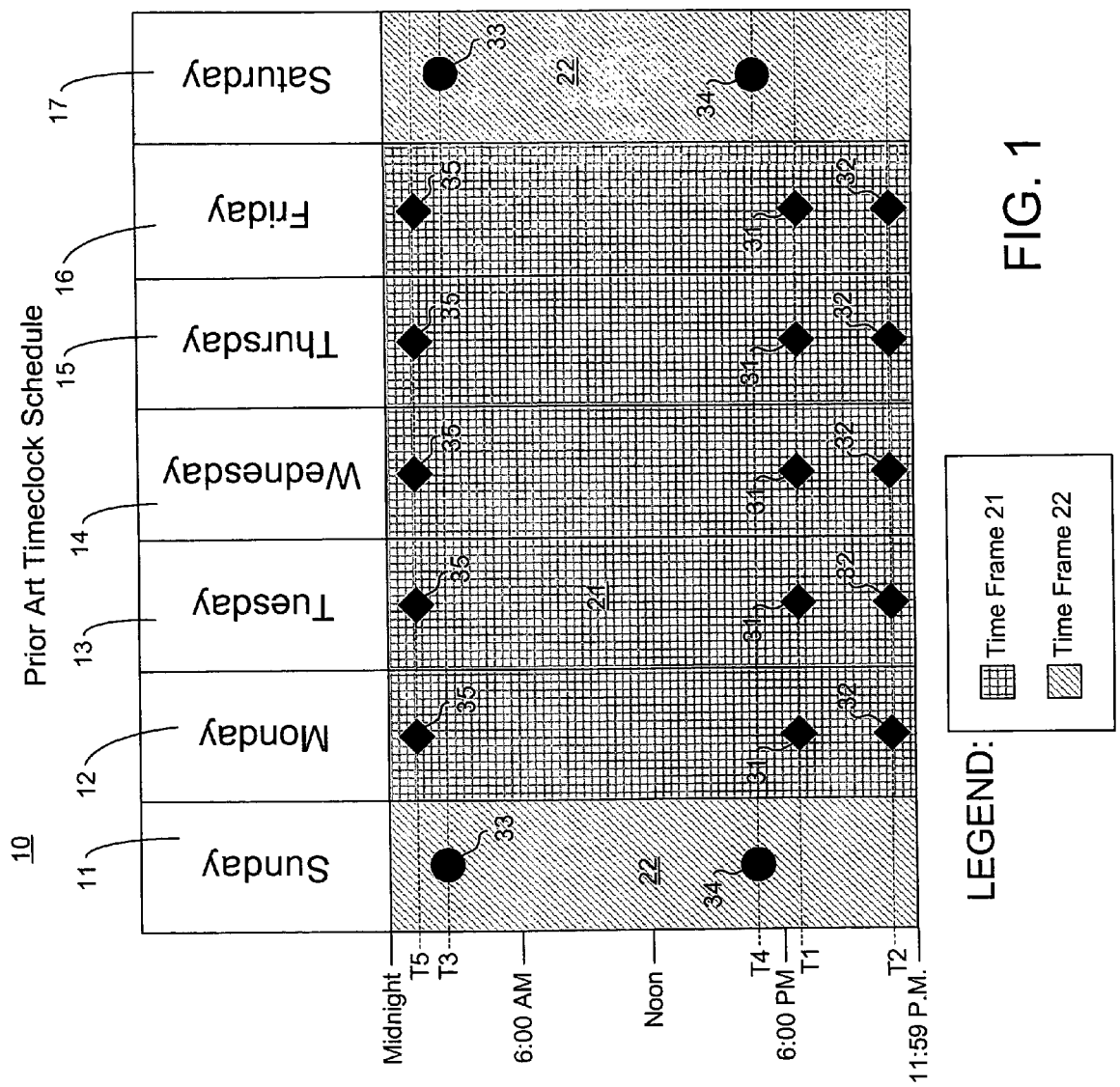
FIG. 1 is a time schedule for a typical two time frame control system.

Referring now to FIG. 1, a diagram of a typical time schedule of a control system that operates based on a two time-frame system is illustrated generally as time schedule 10. In FIG. 1, days 11-17 each have a length of 24 hours and the total 7 days define a week Timeframe 21 that begins on Monday at 12:00 A.M. and ends on Friday at 11:59 P.M. Timeframe 22 begins on Saturday at 12:00 A.M. and ends on Sunday at 11:59 P.M. Timeframe 21 and timeframe 22 are sometimes referred to as the weekday and weekend timeframes, respectively.

Events 31, 32, 33, 34, 35 occur at times T1, T2, T3, T4, T5 respectively. Events can trigger actions in a control system, such as turning on and off lights, selecting lighting presets, turning on and off air conditioning systems, and raising and lowering motorized window shades. The events 31, 32 in timeframe 21 repeat on a daily basis such that each day in timeframe 21 has the same events 31, 32 and event times T1, T2. Similarly, each day in timeframe 22 has the same events 33, 34 and event times T3, T4. For example, event 31 could cause a light to turn on at time T1 on Monday 12 and event 32 could cause a light to turn off at time T2 on Monday 12. The light would also turn on at time T1 on and off at time T2 on Tuesday-Friday 13-16. Weekend timeframe 22 lighting events operate similarly to those of timeframe 21. It should be noted that in a lighting control system, events 31-35 can control multiple zones of lights, such as security lighting, indoor or outdoor lighting, or aesthetic lighting, in one installation.

Events 31-35 and event times T1-T5 of time schedule 10 can be configured via several programming means. One way of programming the time schedule is through a user interface on a device in the control system, such as the timeclock of the RadioRA® lighting control system as previously mentioned. The user interface of such a master control includes an liquid crystal display (LCD) screen for visual feedback to the user and multiple buttons for use in programming the time schedule. Another way of the programming the time schedule is through a graphical user interface (GUI) software running on a personal computer. When a time schedule has been fully programmed, the time schedule information is downloaded from the computer to a master control in the control system. It should be noted that such programming methods are normally advanced such that the normal user would have difficultly programming the time schedule without training or a user's manual.

If a different event occurrence, such as turning on or off a light, is desired for individual days in either of timeframes 21, 22, the lighting control is changed manually. For example, if it is desired to differentiate Friday evening light settings from Tuesday evening, the Friday settings are manually overridden on a temporary or long-term basis to obtain the desired lighting.

The differences in usages of a building on the weekend versus during the weekdays can cause problems with the occurrences of events when using time schedule 10. For example, since a normal residential homeowner stays up later on Saturday night, event 34 on the evening of Saturday 17 might cause an outdoor light to turn on for the evening and then event 33 on the morning of Sunday 11 might cause the outdoor light to turn off. Similarly, event 34 on the evening of Sunday 11 will cause the outdoor light to turn on. However, weekend timeframe 22 is defined as ending, in this conventional system using time schedule 10, on Sunday 11 at 11:59 P.M., and no corresponding turn off event is provided for the outdoor light that turns on at event 34 on the evening of Sunday 11. Also, there is no turn off event on the morning of Monday 12 in timeframe 21. Thus, the outdoor lights would stay on until event 32 on the evening of Monday 12 turns the outdoor light off. An extra event 35 would need to be set to occur at time T5 on the morning of Monday 12 in order to overcome this problem. This requires extra programming and knowledge of the actual problem. A similar problem occurs on the evening of Friday 16. The homeowner might want the outdoor light to remain on until event 33 at time T3 on the morning of Saturday 17. However, the outdoor light will turn off at event 32 at time T4 because Friday 16 is part of the weekday timeframe 21. It would be advantageous to have a time schedule that has the same events on Friday and Saturday evenings and the same events on Sunday through Thursday evenings.

Figure 2:
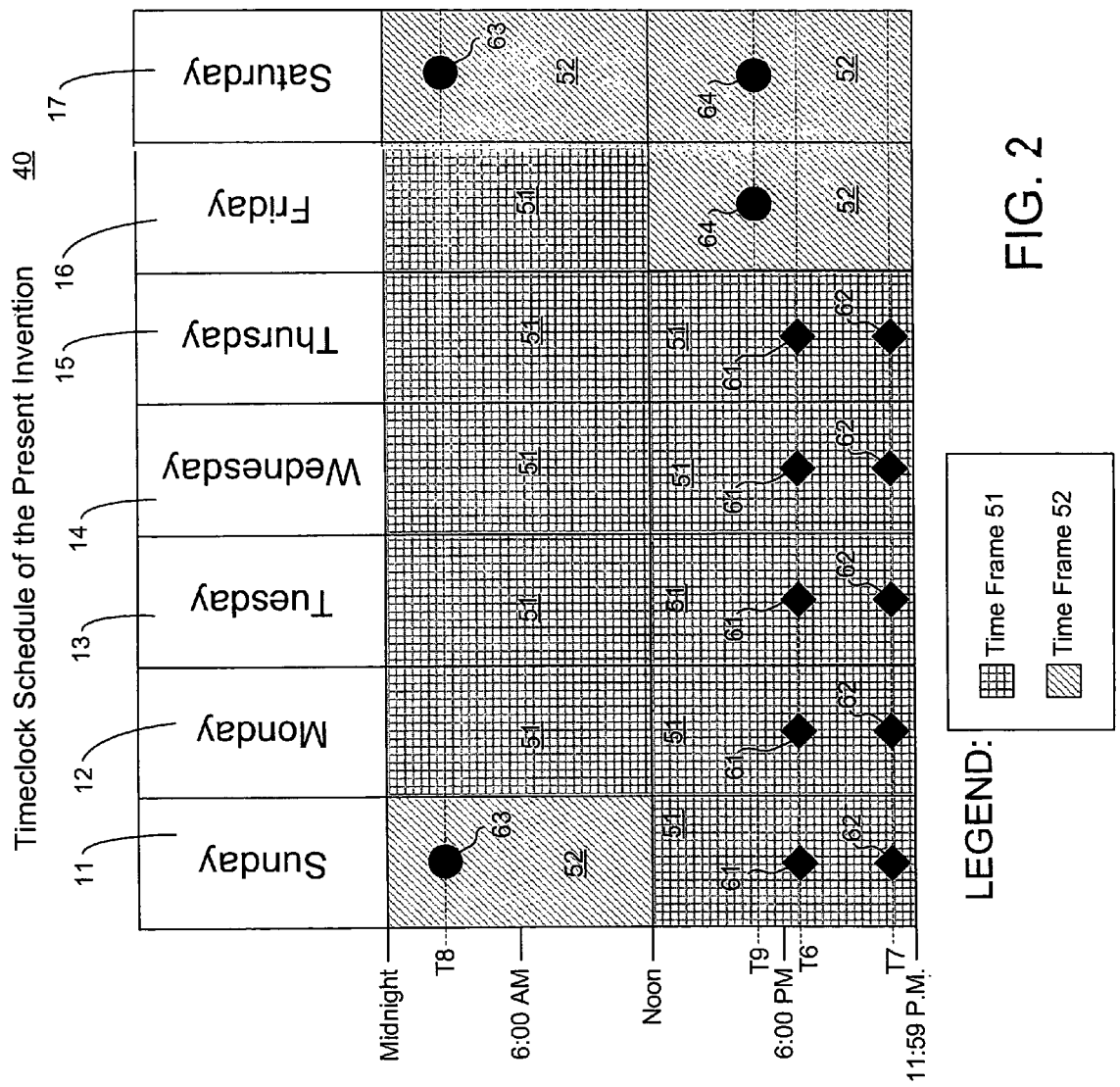
FIG. 2 is a time schedule according to the present invention for controlling a two time frame scenario.

Referring now to FIG. 2, in accordance with the present invention, an exemplary time schedule 40 shows a weekday timeframe 51 and a weekend timeframe 52 that have beginning and ending times that are shifted from the conventional format. Weekday timeframe 51 begins on Sunday 11 at noon and ends on Friday 16 at 11:59 A.M. Weekend timeframe 52 begins on Friday 16 at noon and ends on Sunday 11 at 11:59 A.M.

Events 61, 62, 63, 64 occur at times T6, T7, T8, T9 respectively. In time schedule 40, the events 61, 62, 63, 64 repeat on a daily basis with repeat operation beginning at noon rather than at midnight as in time schedule 10. Sub-timeframes are defined as 24-hour periods beginning at noon on a certain day and ending at 11:59 A.M. on the next day. Each timeframe is made up of a multiple of sub-timeframes. Weekday timeframe 51 is made up of 5 sub-timeframes and weekend timeframe 52 is made up of 2 sub-timeframes. The events 61, 62 in timeframe 51 repeat on a daily basis such that each sub-timeframe in timeframe 51 has the same events 61, 62 and event times T6, T7. Similarly, each sub-timeframe in timeframe 52 has the same events 63, 64 and event times T8, T9.

By adjusting the starting and ending times of the two timeframe definitions, lighting scenarios for a weekend that reflect the practical desired result may be easily realized. Referring to the example of a residential home as discussed above, the problems of time schedule 10 are overcome. During the weekend timeframe 52, the events occur as logically expected for a weekend evening. On the evening of Friday 16, event 64 turns the outdoor light on at time T9. On the morning of Saturday 17, event 63 turns the outdoor light off. The same events repeat on the evening of Saturday 17 and the morning of Sunday 11. By the evening of Sunday 11, the control system is operating in the weekday timeframe. The outdoor light turns on at event 61 at time T6 and off at event 62 at time T7. In this case, the lights do not remain turned on until the morning of and throughout the day of Monday 12. In the embodiment described in FIG. 2, the problem pfeblenis of changing timeframes over the course of a transition from evening to morning is prevented.

In a first embodiment of the invention, the time schedule 40 has two timeframes, the weekday timeframe 51 and the weekend timeframe 52. The beginning and ending times of the weekday timeframe 51 are fixed at noon on Sunday 11 and 11:59 A.M. on Friday 16, respectively. The beginning and ending times of the weekend timeframe 52 are fixed at noon on Friday 16 and 11:59 A.M. on Sunday 11, respectively. Please note that the beginning and ending times of each timeframe could be defined as noon and 11:59 A.M. respectively.

It should be apparent that timeframes 51,52 can be variable in duration, and begin and end at different times from each other. In addition, multiple timeframes are contemplated for control events under the scope of the present invention. For example, two or more timeframes may be defined to be practical for real world situations. Several persons in a given residential or commercial building may have different weekly schedules, for example, that are better served by the control system with more than two timeframes for control events.

In a second embodiment of the invention, the time schedule 40 has two or more timeframes and the beginning and ending times of each timeframe are determined by a user input. Such a user input can be provided through standard programming means for the time schedule, such as the user interface of a master control or GUI software as previously discussed The invention provides greater flexibility in obtaining desired lighting controls, without unexpected or inappropriate results. Lighting events according to conventional weekday and weekend definitions are shifted to more appropriate timeframes according to the timeframe redefinition provided in the present invention. The present invention provides the advantages of obtaining greater efficiency with a simpler control, and saves complexity, cost and energy usage.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of controlling timed events arranged to occur during two timeframes in a week, the week comprising equal days, a total time in the timeframes being equal to a total time in the week, the method comprising the steps of:

setting a first timeframe to begin at a first time during a first day and to end at a second time during a second day, the first timeframe including a portion of the first day that is less than a total time of the first day and a portion of the second day that is less than the second day;

setting a second timeframe to begin just after the second time of the second day and to end just before the first time of the first day; and programming a controlled event to occur at a specific time of day, for each portion of a day including the specific time of day, that is included within the first timeframe.

2. The method of claim 1, wherein the first time is about noon on Sunday and the second time is about noon on Friday, the first timeframe comprising a weekday timeframe and the second timeframe comprising a weekend timeframe.

* * * * *